(12) United States Patent
Lindström et al.

(10) Patent No.: US 11,264,180 B2
(45) Date of Patent: Mar. 1, 2022

(54) METHOD FOR MANUFACTURING DYE-SENSITIZED SOLAR CELLS AND SOLAR CELLS SO PRODUCED

(75) Inventors: Henrik Lindström, Uppsala (SE); Giovanni Fili, Danderyd (SE)

(73) Assignee: EXEGER OPERATIONS AB, Stockholm (SE)

( * ) Notice: Subject to any disclaimer, the term of this patent is extended or adjusted under 35 U.S.C. 154(b) by 530 days.

(21) Appl. No.: 14/350,439

(22) PCT Filed: Apr. 5, 2012

(86) PCT No.: PCT/EP2012/056374
§ 371 (c)(1),
(2), (4) Date: May 21, 2014

(87) PCT Pub. No.: WO2013/053501
PCT Pub. Date: Apr. 18, 2013

(65) Prior Publication Data
US 2014/0251428 A1    Sep. 11, 2014

Related U.S. Application Data

(60) Provisional application No. 61/545,793, filed on Oct. 11, 2011.

(51) Int. Cl.
*H01G 9/20* (2006.01)

(52) U.S. Cl.
CPC ......... *H01G 9/2022* (2013.01); *H01G 9/2027* (2013.01); *H01G 9/2059* (2013.01); *Y02E 10/542* (2013.01); *Y02P 70/50* (2015.11)

(58) Field of Classification Search
USPC ................................. 136/243–265
See application file for complete search history.

(56) References Cited

U.S. PATENT DOCUMENTS

| 3,266,893 A | 8/1966 | Duddy | |
|---|---|---|---|
| 2005/0129877 A1* | 6/2005 | Akada | C08J 5/043 428/1.6 |
| 2007/0209696 A1* | 9/2007 | Duerr | H01G 9/2031 136/252 |
| 2009/0267066 A1* | 10/2009 | Yamazaki | H01L 31/03685 257/51 |

(Continued)

FOREIGN PATENT DOCUMENTS

| EP | 2 061 049 A2 | 5/2009 |
|---|---|---|
| JP | 2006028616 A | 2/2006 |

(Continued)

OTHER PUBLICATIONS

Japanese Office Action dated Mar. 1, 2016 for the corresponding Japanese Patent Application No. 2014-534969.

(Continued)

*Primary Examiner* — Dustin Q Dam
(74) *Attorney, Agent, or Firm* — Tucker Ellis LLP

(57) ABSTRACT

A dye-sensitized solar cell having a porous conductive powder layer, which layer is formed by deposition of a deposit comprising metal hydride particles onto a substrate;

(Continued)

Figure 1:
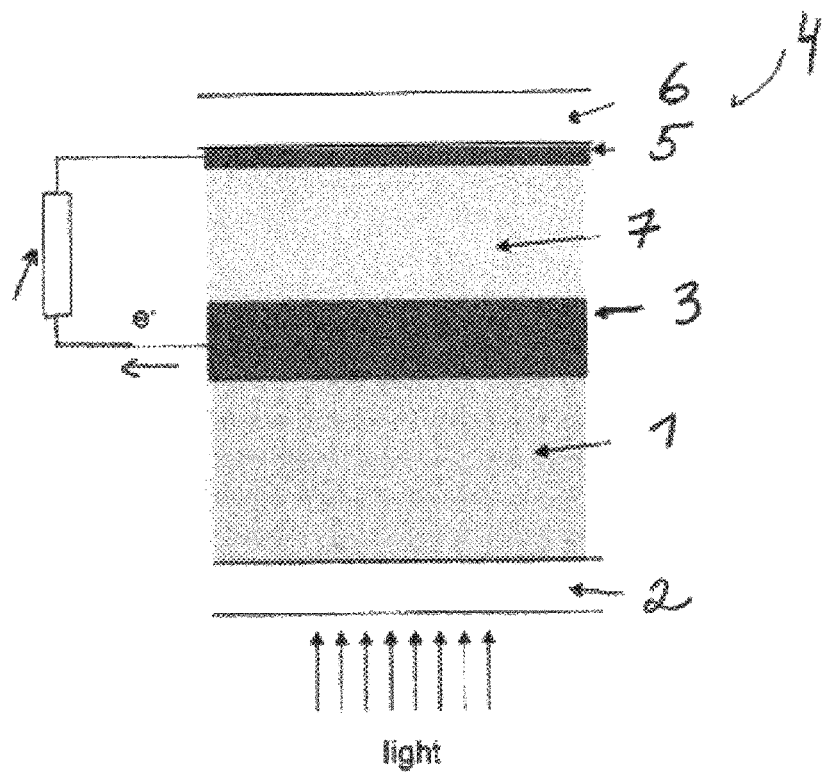

heating the deposit in a subsequent heating step in order to decompose the metal hydride particles to metal particles; and sinter said metal particles for forming a porous conductive powder layer.

12 Claims, 3 Drawing Sheets

(56) References Cited

U.S. PATENT DOCUMENTS

| | | |
|---|---|---|
| 2009/0314339 A1 | 12/2009 | Hayase et al. |
| 2010/0022078 A1* | 1/2010 | Rockenberger .......... C09D 5/24 438/585 |
| 2010/0258182 A1 | 10/2010 | Akimoto |
| 2011/0023932 A1* | 2/2011 | Fukui ................... H01G 9/2081 136/244 |
| 2011/0240086 A1* | 10/2011 | Morooka ............. H01G 9/2081 136/244 |
| 2012/0055549 A1 | 3/2012 | Kohno et al. |
| 2012/0132267 A1* | 5/2012 | Shinohara ............ H01G 9/2036 136/256 |

FOREIGN PATENT DOCUMENTS

| | | |
|---|---|---|
| JP | 2013084551 A | 5/2013 |
| WO | WO-2010150461 A1 | 2/2006 |

OTHER PUBLICATIONS

Kashiwa et al., "All-Metal-Electrode-Type Dye Sensitized Solar Cells (Transparent Conductive Oxide-Less Dye Sensitized Solar Cell) Consisting of Thick and Porous Ti Electrode with Straight Pores", Applied Physics Letters, American Institute of Physics, vol. 92, No. 3, Jan. 25, 2008, pp. 33308-1-33308-3; XP012107893.

International Search Report and the Written Opinion of the International Searching Authority dated Jun. 20, 2012 issued in corresponding Application No. PCT/EP2012/056374.

International Preliminary Report on Patentability dated Jan. 23, 2014 issued in corresponding Application No. PCT/EP2012/056374.

Kashiwa et al., "All-metal-electrode-type dye sensitized solar cells (transparent conductive oxide-less dye sensitized solar cell) consisting of thick and porous Ti electrode with straight pores", Applied Physics Letters 92, pp. 333308-1-033308-3, American Institute of Physics (2008).

Office Action dated Apr. 25, 2019 in corresponding India Patent Application No. 3398/CHENP2014 (7 pages).

\* cited by examiner

METHOD FOR MANUFACTURING DYE-SENSITIZED SOLAR CELLS AND SOLAR CELLS SO PRODUCED

CROSS REFERENCE TO RELATED APPLICATIONS

This application is a National Phase filing under 35 U.S.C. § 371 of PCT/EP2012/056374 filed on Apr. 5, 2012; and this application claims the benefit of U.S. Provisional Application No. 61/545,793 filed on Oct. 11, 2011 under 35 U.S.C. § 119; the entire contents of all are hereby incorporated by reference.

TECHNICAL FIELD

The invention concerns a method for producing dye-sensitized solar cells, DSC, comprising at least one electrode of a porous conductive powder layer and said DSC having improved electrical performance.

BACKGROUND OF THE INVENTION

There is an increasing demand for lower cost photovoltaic solar cells.

Dye-sensitized solar cells (DSC's) developed by M Grätzel et al are a new type of solar cells made of low-cost materials and can be manufactured by conventional printing techniques, see for example U.S. Pat. No. 5,084,365.

The conventional DSC has a few micrometer thick porous $TiO_2$ working electrode layer deposited onto a transparent conducting substrate. The $TiO_2$ working electrode comprises interconnected $TiO_2$ particles dyed by adsorbing dye molecules (typically a Ruthenium polypyridyl complex) on the surface of the $TiO_2$ particles. The transparent conducting substrate is normally a transparent conducting oxide (TCO), for example fluorine-doped tin oxide (FTO), deposited onto a glass substrate. Other types of TCO materials, such as indium tin oxide (ITO), or aluminum doped zinc oxide, or antimony doped tin oxide, are used as well. The TCO layer serves the function as a back contact extracting photo-generated electrons from the dyed $TiO_2$ working electrode. The $TiO_2$ electrode is in contact with an electrolyte (typically containing $I^-/I_3^-$ ion pairs) and another transparent conducting substrate, i.e., a counter electrode. The TCO layer of the counter electrode is usually covered with a thin catalytic layer of platinum. The platinum has a strong catalytic effect, facilitating the electron transfer to the electrolyte.

The edges of the conducting substrates are usually not deposited with $TiO_2$ electrode material. The two conducting substrates are sealed at the edges in order to protect the DSC components against the surrounding atmosphere, and to prevent the evaporation or leakage of the DSC components inside the cell.

The incoming light passes through the TCO to create photo-generated electrons from the dyed $TiO_2$ working electrode. TCO has a shading effect as it absorbs parts of the incoming light thus lowering the amount of light reaching the dyed $TiO_2$ working electrode. Increased transparency in the TCO leads to lower conductivity and vice versa. It is not possible to have high transparency and high conductivity at the same time.

Due to the low conductivity of the transparent conducting oxide TCO, the cells must be deposited in segments or strips with gaps in between. Current collectors are deposited in the gaps to connect the segments or strips to form solar cell modules. The wider the segments the greater the electronic ohmic losses in the TCO layer because of poor TCO conductivity.

The individual cells are electrically connected in parallel or in series to enhance the DSC current or DSC voltage, respectively. The electrical connection can be made outside the cells using peripheral equipment such as cables or solders. Alternatively, the electrical connection can be made inside the cells by distributing the DSC components in such a way that the desired parallel or series connection of the cells is achieved.

The low conductivity of the transparent conductive oxide, TCO, is a problem as it limits the width of the segments. Another problem is that TCO-based glass is expensive, and the use of two TCO-based glasses in the DSC construction increases the cost even further. In order to resolve these problems, attempts have been made to exchange the TCO-based glass of the back contact by vacuum deposit of a conductive metal layer on the $TiO_2$ working electrode by using metal sputtering techniques. Since the deposited sputtered metal layer is electrically conductive, the TCO-based glass can be exchanged with a TCO-less glass, which is much cheaper.

In Yohei Kashiwa, Yorikazu Yoshida, and Shuzi Hayase, PHYSICS LETTERS 92, 033308 (2008)) is described electro-spraying of a tetrapod-shaped ZnO onto the $TiO_2$ layer followed by sputtering of titanium metal on top of the ZnO covered $TiO_2$ layer. The tetrapod-shaped ZnO, which was embedded in the titanium layer, was then washed away by subsequent ZnO dissolution in HCL in order to form a sufficiently porous titanium layer. The porosity of the titanium layer must be sufficient in order not to create electrolyte ion diffusion limitations with resistive losses as a consequence. Also, the dye-sensitization process can be slowed down due to diffusion problems through the titanium layer.

Yohei Kashiwa, Yorikazu Yoshida, and Shuzi Hayase, PHYSICS LETTERS 92, 033308 (2008)) and US2009314339 describe methods for increasing porosity of vacuum deposited metal layers. In US2009314339 a fine-particle layer is formed on the surface of the porous $TiO_2$ layer and subsequently a conductive metal film is formed on the surface of the fine-particle layer; and thereafter the fine-particle layer is removed by heating or solvent-cleaning. Sputtering and vacuum deposition of metal layers are very expensive and slow methods that are not suitable for mass-production of large areas. It is also not possible to form layers of sufficient thickness and porosity with these methods.

Other attempts have been made to lower the internal resistance of the back contact by placing the back contact on the opposite side of the working electrode from the incident light and form the back contact as a porous metal film in contact with the working electrode.

In EP1708301 is described a dye-sensitized solar cell made by printing an alumina green sheet substrate and thereafter provide a second collector electrode by screen printing a paste containing tungsten particles to a thickness of 1 to 10 micrometer; a conductive film of a platinum-containing metalized ink is screen printed over the second collector electrode (counter electrode). A further alumina green sheet for an insulating layer is formed by screen printing an alumina slurry onto the conductive film. Onto the alumina green sheet layer a first collector electrode (back contact) is applied by screen printing the tungsten-containing paste. Thereafter, the green lamina is sintered at 1500°

C. in a reducing atmosphere and then the titania electrode layer is printed on the sintered laminate and dyed and thereafter the cell is sealed.

The second collector electrode need not be a printed layer and can be exchanged by a metal substrate instead. The metal can be tungsten, titanium, nickel, platinum, gold or cupper.

The tungsten particles in the paste could be exchanged with other metals, such as titanium or nickel. A pore-forming oxide material may be included in the paste, in order to secure a porosity of 10 to 30% so that the electrolyte can be distributed in the porous material.

Screen printing of the substrate is a slow procedure which often results in defects, like pin-holes in the material, which makes it difficult to print the conductive metal layer onto the green substrate.

The printed laminae are integrally sintered at 1500° C. The high sintering temperature may be needed to achieve a sintering effect between the tungsten particles.

The high temperature apart from the heating costs also requires the cell to contain specific materials that can withstand the high temperature. Sintering at high temperature is also combined with a risk of contaminating the conductive material and thus deteriorates its conducting properties.

In WO2011096154 is described a sandwich type dye-sensitized solar cell with a porous conductive metal layer formed on a glass cloth or a glass paper substrate. The porous metal layer can be formed by sputtering or by printing a paste containing titanium particles to a thickness of 0.3 to 100 micrometer. A titania paste is printed repeatedly onto the porous conductive metal film and calcinated at 400 C until the desired thickness is achieved. A transparent resin sheet can thereafter be glued to the titania electrode. Another resin sheet is provided with a transparent conductive film having a thin layer of sputtered platinum and is arranged on the top side of the glass cloth and electrolyte is provided and the cell sealed. The fine titanium metal powder used is very expensive and the procedures for preparing the cell are complicated.

Another problem with the above solutions concerns the metal particles used for forming electrodes. Tungsten particles and titanium particles have a thin layer of oxide on the surface which impairs electrical contact between the particles.

In PCT/EP2011/067603 (not published) is shown a method for producing dye-sensitized solar cells comprising a back electrode and a counter electrode of porous conductive powder layer, where the porous conductive powder layer can be made by printing a powder of metal or metal hydride and thereafter compact the powder layer to achieve contact between the particles. The hydride particles are heat treated after compaction so as to transform the hydride to metal. A further heat treatment is optional.

The compacting step is costly and can introduce irregular zones, where the material is aggregating in unwanted ways which can cause problems when the electrolyte of the DSC shall be evenly distributed throughout the layer. This is especially pronounced for layers of metal hydride particles, which to a larger degree consist of non-conform shape particles.

DESCRIPTION OF THE INVENTION

It is an objective of the present invention to provide a cost-effective method for producing a dye-sensitized solar cell, DSC, having a porous conductive powder layer.

The porous conductive powder layer will have low electrical losses due to its low resistivity. The porosity of the porous conductive powder layer will enable ionic and dye transport through the layer.

The DSC comprising a porous conductive powder layer will have increased current-handling capability. This enables building of modules of dye-sensitized solar cells where each cell can have a larger area.

The porous conductive powder layer can have different functions in the DSC:
  Back contact function. A back contact extracts electrons from the working electrode.
  Counter electrode function. The counter electrode transfers electrons to the electrolyte.
  Both the back contact and counter electrode can be porous conductive powder layers.

A porous conductive powder layer used as a back contact is in direct electrical contact with the working electrode.

The counter electrode comprises a second porous conductive powder layer. The second porous conductive powder layer can have catalytic particles integrated in the porous conductive powder structure. Alternatively the second porous conductive layer comprises a porous conductive powder layer and a separate catalytic layer in direct contact with the porous conductive powder layer. The second porous conductive powder layer is formed in the same way as the porous conductive powder layer.

The porous conductive powder layer is formed by:
  Deposition of a deposit comprising metal hydride particles onto a substrate;
  Heating the deposit in a subsequent heating step in order to decompose the metal hydride particles to metal particles; and sinter said metal particles for forming a porous conductive powder layer.

In case the second porous conductive layer is in contact with a separate catalytic layer then the second porous conductive powder layer is formed by:
  Deposition of a deposit comprising metal hydride particles onto a catalytic layer or depositing the catalytic layer onto the deposit comprising metal hydride particles.
  Heating the deposit in a subsequent heating step in order to decompose the metal hydride particles to metal particles; and sinter said metal particles for forming a porous conductive powder layer.

In order to minimize the cell resistance it is advantageous to deposit the catalytic layer as close as possible to the back contact layer.

The metal hydrides are brittle and the metal hydride particles have a non-spherical, irregular form. The deposit of metal hydride particles form a relatively stable layer and compaction of the layer in order to achieve inter-particle contact and mechanical stability is not necessary. In a subsequent heating step or steps the metal hydride particles are decomposed to metal particles and the metal particles are sintered to form a porous conductive powder layer. The decomposition of the metal hydride particles can take place in the same heat treatment step as the sintering or be performed in a separate step prior to the sinter heat treatment step. The sinter is preferably performed in vacuum or inert gas in order to prevent contamination of the particles.

The heat treatment temperatures sufficient for sintering between the particles to take place depend on the material used. Temperatures are normally in the range of 550-1250° C., or 550-850 C or 700-1200° C.

A first heat treatment step below the sinter temperature and above the hydride decomposition temperature in order to first release the hydrogen prior to sintering is normally made at a temperature in the range of 300-600° C. $TiH_2$, for example, can be preheated at 350° C.-550° C. to release a substantial amount of hydrogen before sintering.

The metal particles formed from metal hydride particles receive a non-spherical, irregular form and can be basically free from oxide on the surface. This makes the particles suitable for forming a porous conductive powder layer with excellent conductivity.

For printing the deposit various techniques known in the art can be used. Examples of printing techniques are slot die coating, gravure, screen printing, knife coating, blade coating, doctor blading, flexo printing, dip coating or spraying. The dry powder deposition can be made by for example sieving or electrostatic powder deposition.

The metal hydrides particles can be mixed with a liquid to form an ink suitable for the printing process. The particles may also be milled or otherwise treated in order to achieve a particular particle size or sizes for forming the porous conductive powder layer. Other components also in solid form may be added to the ink. The deposit for dry powder deposition may contain other components for facilitating the deposition process.

The deposit of metal hydrides can be mixed with particles of pure metals or metal alloys.

The porosity of the porous conductive powder layer is important in order to secure the passage of the electrolyte in the structure. If the electrolyte is not well distributed, the efficiency of the cell will decrease.

The porosity of the porous conductive powder layer shall preferably be between 30 to 70% or between 45 to 65%, or 40 to 60%.

The metal hydrides can be hydrides of pure metals or hydrides of metal alloys or mixtures thereof.

The resulting metal component forming the porous conductive powder layer must have a suitable corrosion resistance as to withstand the environment in the DSC.

The metal hydride is preferably a hydride of titanium or titanium alloy or mixtures thereof. Other examples are hydrides of nickel alloys, like for example Hastelloy, Incoloy, Inconel; Haynes alloy and Monel or hydrides of molybdenum, tungsten, chromium, zirconium, niobium or their alloys or mixtures thereof.

Depending on which metal is used for the porous conductive powder layer and which application method is used; the thickness of the layer can vary from around 1 micro-meter up to 100 micro-meters or from 1 micro-meter to 50 micro-meters.

The deposition can be made onto various types of substrates. The substrate can be rigid or flexible and dense or porous.

Examples of substrates are TCO-less glass, TCO-covered glass, glass, metal. Other examples of substrates are porous ceramic substrates. Examples of porous ceramic substrates are glass microfiber-based substrates, or aluminosilicate fiber based substrates or substrate comprising aluminosilicate fibres and glass fibres.

The porous ceramic substrates have several advantages as substrates since they are chemically inert, can withstand high temperatures, and are readily available and cheap and simple to handle in various process steps. The porous substrates are electrical insulators, but allowing liquids and electrolyte ions to penetrate.

The porous substrates are flexible and can be handled in the form of sheets or in the form of rolls for a continuous process.

Substrates with release function enables the formation of free-standing porous conductive powder layers which may in be integrated into the cell structure during manufacturing of the DSC. Examples of such substrates are e.g., graphite, zirconia, yttrium oxide, boron nitride or substrates equipped with a thin release layer of, for example, zirconia, yttrium oxide, boron nitride to make it possible to form free-standing porous conductive powder layers.

It is also possible to print a porous conductive powder layer onto a DSC component like a separator layer or a working electrode.

The porous conductive powder layer can be formed from a deposit comprising a catalyst thus forming a second porous conductive powder layer. Said second porous conductive powder layer is suitable as counter electrode of the DSC.

The porous conductive layer can also be in direct contact with a catalytic layer thus forming a second porous conductive powder layer. Said second porous conductive powder layer is suitable as a counter electrode of the DSC.

Deposition onto a porous substrate can be made by deposing a deposit onto both sides of a porous substrate. On one side the deposit can form a porous conductive powder layer and on the other side the deposit can form a second porous conductive powder layer. The subsequent heat treatment of the deposits can be made after deposition onto both sides of the substrate has taken place.

The back contact and counter electrode are formed by the porous conductive powder layer and the second porous conductive powder layer respectively. In order for light to reach the working electrode, a transparent substrate is placed on the side of the incident light.

There are several advantages with a DSC comprising a porous conductive powder layer and/or a second porous conductive powder layer in accordance with the present invention:

the use of metal hydrides enables the porous conductive powder layer to be formed from relatively inexpensive materials;

the transformation of metal hydride particles to metal particles with non-spherical, irregular form gives porous layers with an evenly distributed porosity;

the metal particles are substantially free of oxygen and the sinter results in a porous layer with good metal particle-to-particle connection, thus having excellent conductivity;

the porous conductive powder layers allowing for fast electrolyte ion transport and fast dye-sensitization;

thicker porous conductive powder layers can be formed without electrolyte ion transport or dye-sensitization problems;

highly conductive porous conductive powder layer films can be formed allowing for the printing of wider solar cell segments;

printing or dry powder deposition are much faster and cheaper than vacuum deposition techniques, such as sputtering deposition or electron beam evaporation deposition and can be done selectively so there is no need for expensive masking, the layers can be printed in patterns;

the process for forming the porous conductive powder layers is very flexible and a variety of substrates are available.

A reason explaining the superior conductivity when using, for example, $TiH_2$ particles instead of Ti particles could be that the reducing atmosphere caused by the hydrogen gas that is released during the vacuum sintering procedure efficiently removes any oxide from the surface of the titanium hydride particles.

Another possible explanation for the superior electric conductivity is that the non-spherical, irregular shaped titanium particles formed by $TiH_2$ based particles receives a high particle-to-particle inter-connectivity, which benefits the sinter process and thus enables the formation of a both porous and electrically conductive powder layer.

The simplicity of printing or dry powder deposition of a deposit, the inexpensive materials used and the improved conductivity of the DSC comprising the porous conductive powder layer result in a cost optimized dye sensitized solar cell with improved performance characteristics.

DETAILED DESCRIPTION OF THE INVENTION

The present invention will be further explained with reference to the following description of exemplary embodiments and accompanying drawings.

The reference to $TiO_2$ as working electrode is not limited to $TiO_2$, but could be any other material or materials suitable to form the dyed working electrode of the DSC, such as for example ZnO. Likewise, the dye can be any dye suitable for the working electrode and the electrolyte any electrolyte or solid electrolyte suitable for a DSC.

The examples below are shown with deposits comprising titanium hydride. The titanium hydride can also be a titanium alloy hydride or a mixture of titanium hydride and titanium alloy hydride.

Other metal hydrides can also be used, for example hydrides of nickel alloys, like Hastelloy, Incoloy, Inconel; Haynes alloy and Monel or hydrides of molybdenum, tungsten, chromium, niobium or their alloys or mixtures thereof.

The deposit comprising metal hydride particles can be prepared as an ink suitable for printing. The ink may comprise organic binders for, e.g. improving print quality. The binders are removed before the sinter heating step is performed.

The organic substances may be removed in a heat treatment of the deposit in reducing atmosphere such as, e.g., hydrogen atmosphere or $H_2/Ar$ atmosphere.

For forming the second porous conductive powder layer, the deposit for printing a counter electrode may comprise a catalyst. Alternatively a solution comprising a catalyst is printed separately onto a pre-formed porous conductive powder layer. The catalyst can be catalytic amounts of platinum or other known catalysts suitable for a DSC. For example, it is possible to platinise conducting carbon powder and form a surface layer of platinum on the carbon surface. Such platinised carbon powder could be added to the ink forming the deposit for the second porous conductive powder layer to render it catalytic properties. Alternatively the porous conductive powder layer is deposited on top of a catalytic layer. An example of a catalytic layer is a porous conductive powder layer of titanium comprising platinized carbon particles.

Before deposition onto a porous substrate; it can be advantageous to first make the fibre substrate surface smoother. This can be done in various ways, for example by depositing an inert porous ceramic such as aluminosilicate, SiO2, $Al_2O_3$ or some other high temperature compatible ceramic which is also chemically compatible with the DSC cell components onto the surface of the porous substrate. The porous substrate can also be made smoother by applying pressure and possibly also heat to the porous substrate, e.g. by passing the porous substrate through pressurized rollers.

Figure 2:
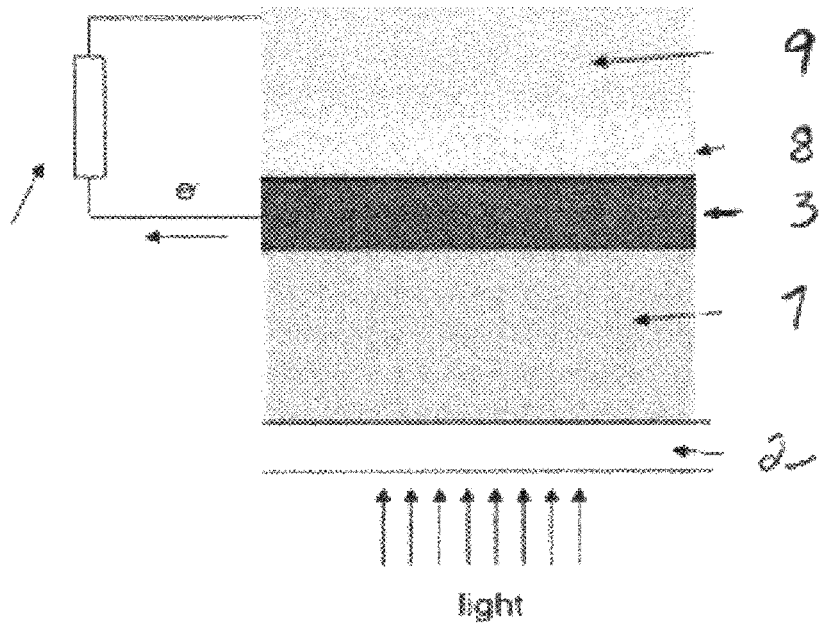
Figure 3:
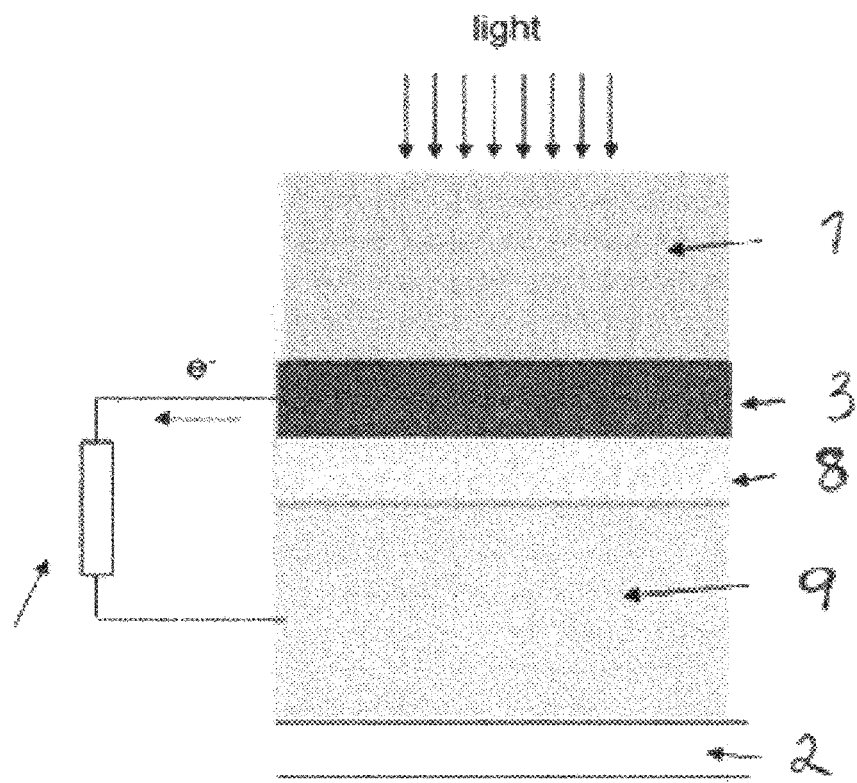

A DSC can have different lay-outs. Examples of lay-outs of DSCs comprising porous conductive powder layer are shown in FIGS. 1-3. The examples are not an exhaustive list of possible DSC lay-outs.

FIG. 1—A cross section of a sandwich type DSC
FIG. 2—A cross-section of a monolithic type DSC
FIG. 3—A cross-section of a monolithic type DSC
FIG. 4 *a, b, c*—SEM photos of a sintered metal particle layer FIG. 1 shows a cross-section of a sandwich type DSC. A dyed $TiO_2$ working electrode layer 1 is positioned on top of a substrate 2. A porous conductive powder layer 3 is positioned on top of the dyed $TiO_2$ working electrode layer 1. A counter electrode 4 comprising a platinized porous conductive powder layer 5 and a substrate 6 are positioned opposite to the working electrode 1. The electrolyte 7 is penetrating the porous conductive powder layer 3 and the working electrode 1 and the counter electrode 4.

The porous conductive powder layer 3 works as a back contact to the dyed $TiO_2$ working electrode layer 1. This means that a TCO back contact layer used in conventional DSC can be omitted and be replaced by a porous conductive powder layer. The porosity of the porous conductive powder layer 3 allows for the electrolyte 7 to penetrate and pass through the porous conductive powder layer. Photo-generated charges created in the dyed $TiO_2$ can be extracted by the porous conductive powder layer.

A counter electrode 4 having a second porous conductive powder layer comprising platinum catalyst is replacing a platinized TCO layer on glass in terms of both electrical conductivity and catalytic effect.

The second porous conductive powder layer in the DSC can serve the function as solely an electron conductor in the counter electrode and in such a case a separate catalytic layer must be included in the counter electrode and be in direct contact with porous conductive powder layer.

The substrate 2 on dyed $TiO_2$ working electrode layer 1 shall be a transparent substrate, like glass.

FIG. 2 shows a cross-section of a monolithic type DSC. A dyed $TiO_2$ working electrode layer 1 is shown on top of a substrate 2. A porous conductive powder layer 3 is showed on top of the dyed TiO2 working electrode layer 1. A porous separator 8 is deposited on top of the porous conductive powder layer 3. A second porous conductive powder layer comprising a catalyst act as porous counter electrode 9 deposited on top of the separator 8. The electrolyte (not shown in FIG. 2) penetrates the counter electrode 9, the separator 8, the porous conductive powder layer 3 and the dyed $TiO_2$ working electrode layer 1.

The porous conductive powder layer 3 works as a back contact to the working electrode 1. This means that a TCO back contact layer used in conventional DSC can be omitted and be replaced by a porous conductive powder layer. The porosity of the porous conductive powder layer allows for electrolyte to penetrate the porous conductive powder layer and pass through the porous conductive powder layer. The photo-generated charges created in the dyed $TiO_2$ are extracted by the porous conductive powder layer. Since the porous conductive powder layer is electrically conductive, the need for a TCO layer for charge extraction is eliminated. The substrate 2 below the dyed $TiO_2$ working electrode layer 1 shall be transparent, for example glass or plastics.

The separator 8 is a porous and chemically inert and poorly electrically conductive oxide, such as alumina, aluminosilicate, magnesia, silica, and zirconia. The separator material should also be substantially inert to the electrolyte and the dye sensitization processes. The separator layer 8 should bond well to the porous conductive powder layer 3 and provide adequate electrical insulation as well as good porosity and electrolyte permeation at minimal ohmic drop in the electrolyte. It is possible to form a separator layer by multiple depositions of chemically inert and poorly conducting layers of the same or different materials. It is also possible to form a separator layer by the deposition of alternating layers of chemically inert and poorly electrically conductive layers.

The porous counter electrode 9 can have a catalytic layer and a conducting layer. The catalytic layer is adapted to catalyse the redox reaction at the counter electrode in the cell.

FIG. 3 shows a cross-section of a monolithic type DSC. A porous conductive powder layer comprising platinum particles is deposited as porous counter electrode 9 on top of a substrate 2, a separator 8 is deposited on top of the porous counter electrode 9, a porous conductive powder layer 3 is formed on top of the separator 8, and a $TiO_2$ working electrode layer 1 is deposited on top of the porous conductive powder layer 3. The electrolyte (not shown in FIG. 4) is in contact with the counter electrode 9, the separator 8, the porous conductive powder layer 3, and the dyed working electrode 1.

In FIG. 3, the porous conductive powder layer 3 works as a back contact to the working electrode 1. This means that a TCO back contact layer used in conventional DSC can be omitted and be replaced by a porous conductive powder layer.

The substrate 2 on the porous counter electrode 9 can be a glass substrate or a metal substrate. In order to produce the DCS shown in FIGS. 1 to 3 the cells are sealed and additionally, electrical connections are made so that the photo-generated current can be used in an external electrical circuit.

FIG. 4 a shows a SEM photo of a free standing porous conductive powder layer of titanium particles formed from titanium hydride. The titanium hydride based ink was deposited on a zirconia substrate and dried. Vacuum sintering was performed at 850° C. for 30 minutes. After the sintering the release properties of zirconia makes it possible to remove the porous conductive powder layer from the zirconia substrate and form a free-standing layer, which can be handled without support. As is shown in the picture the shape of the titanium particles is irregular and non-spherical. The irregular shape of the resulting titanium particles in the porous conductive powder layer, is typical for titanium hydride particles deposit.

Figure 4A:
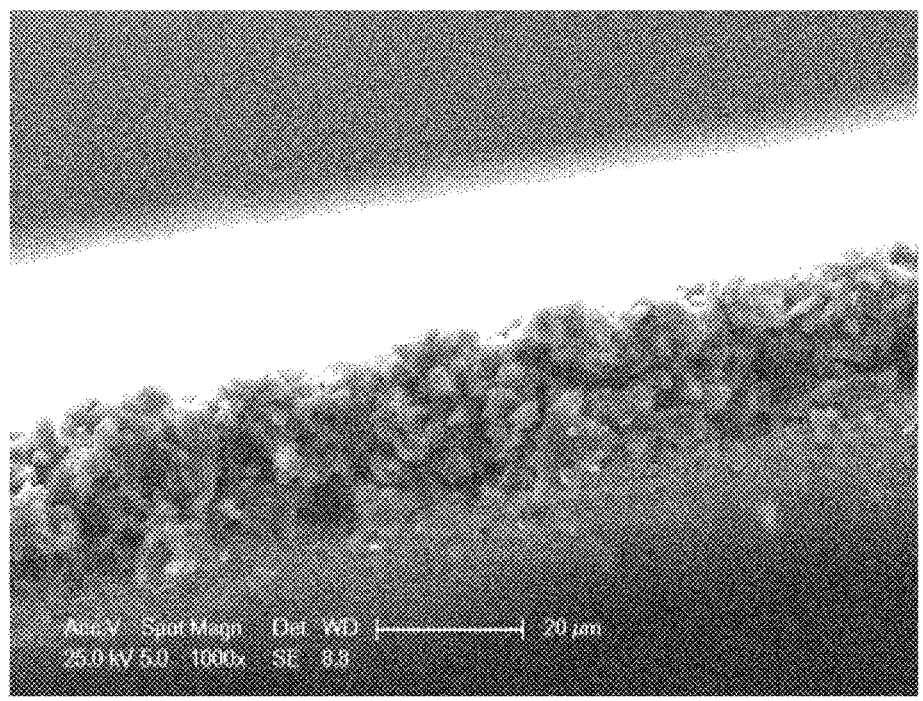
Figure 4B:
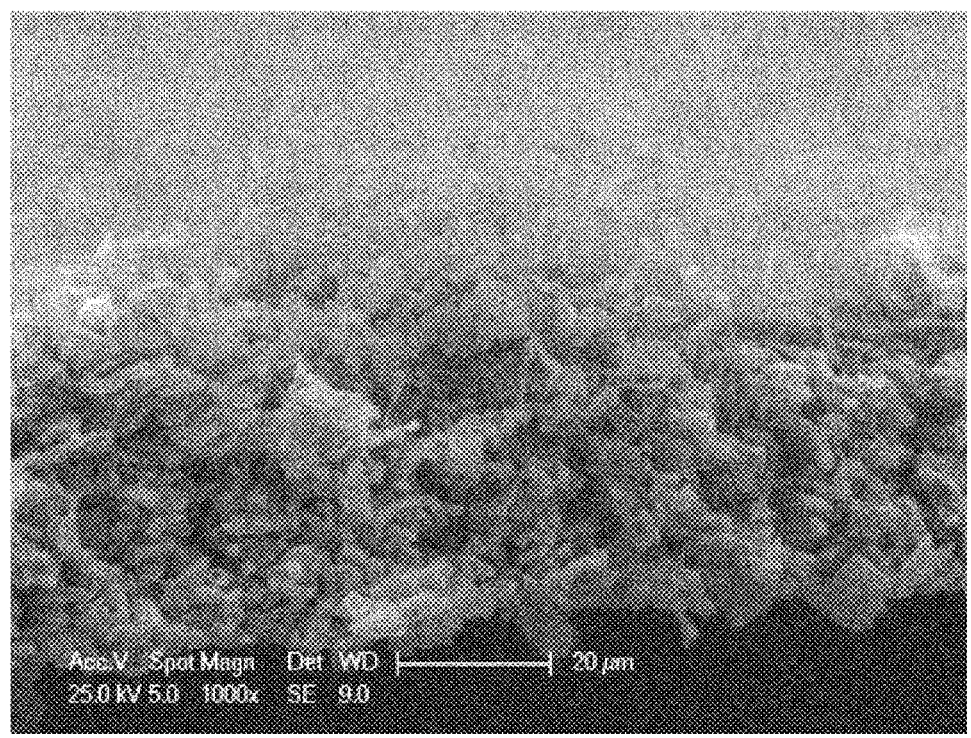

FIG. 4b shows a free standing porous conductive powder layer of titanium particles formed from titanium hydride particles. The titanium hydride ink was deposited on a alumina substrate which was pre-deposited with a layer of boron nitride particles. Vacuum sintering was performed at 850° C. for 30 minutes. As shown in the figure flakes of boron nitride particles are sitting on top of the porous conductive powder layer of titanium.

Figure 4C:
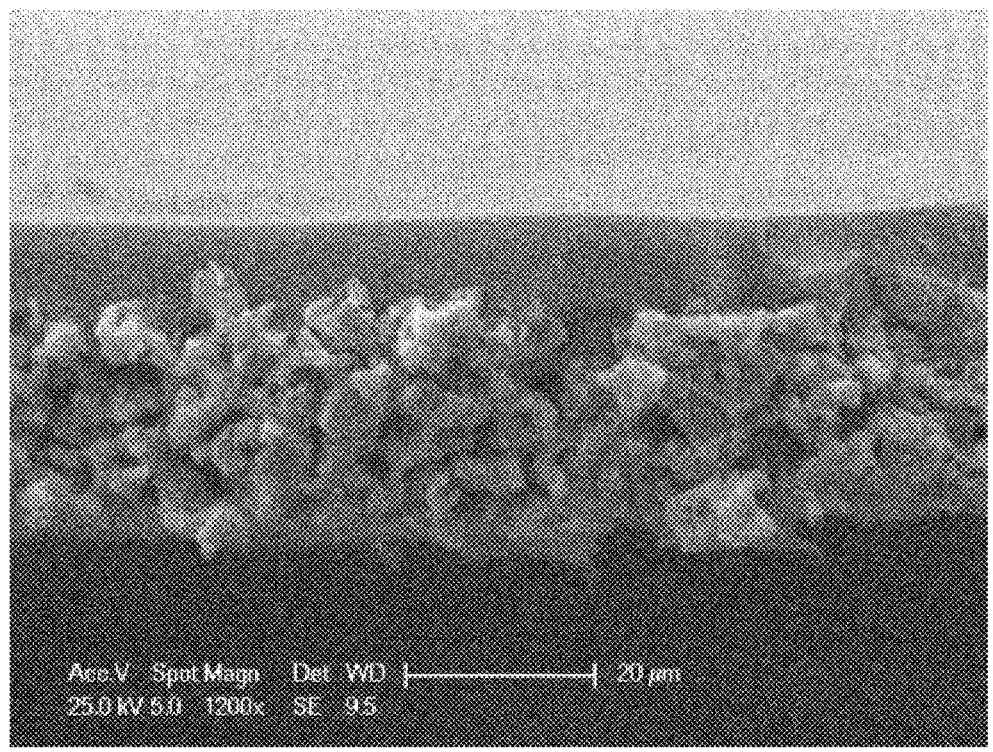

FIG. 4c shows a free standing porous conductive powder layer of titanium particles formed from titanium hydride particles. Sintering temperature of the porous conductive powder layer was 850° C., 30 minutes. As shown in the figure, a layer of porous $TiO_2$ ($TiO_2$ particle size around 20 nm) of the working electrode is deposited on top of the porous conductive powder layer. The baking temperature of the deposited $TiO_2$ was 500° C., 15 minutes.

The SEM micrographs of FIGS. 4a, b and c show the structure of the sintered particles of the porous conductive powder layers having non-spherical and irregular shape titanium particles and the sharp edges of the titanium particles obtained from $TiH_2$ based deposit.

EXAMPLES

Example 1

Porous Conductive Powder Layer on a Ceramic Substrate

An ink is prepared by mixing $TiH_2$ with terpineol. The ink is then bead milled for 25 minutes at 5000 RPM using 0.3 mm zirconia beads. The zirconia beads are separated from the ink by filtration. The filtered ink was then printed onto a 38 μm thick, glass microfiber based substrate and then dried at 200° C. for 5 minutes. Subsequently the coated glass microfiber substrate was vacuum sintered at 585° C. The pressure during sintering was lower than 0.0001 mbar. The resulting porous conductive powder layer is a titanium metal porous film.

Subsequently further DSC components were printed onto the porous conductive powder layer and ceramic microfiber based substrate.

A variation of example 1 is that the substrate is based on aluminosilicate fibres.

Another variation of example 1 is that the substrate comprises a mixture of aluminosilicate fiber and glass microfiber.

Another variation of example 1 is that the substrate prior to printing is passed through heated rubber coated rollers causing a smoothening of the surface of the substrate.

Another variation of example 1 is that the substrate is treated with colloidal silica before passing the substrate through rubber coated rollers.

Example 2

Porous Conductive Powder Layer Printed on a Ceramic Substrate

An ink is prepared by mixing $TiH_2$ with terpineol. The ink was then bead milled for 30 minutes at 4000 RPM using 0.3 mm zirconia beads. The zirconia beads were separated from the ink by filtration. The filtered ink was then printed onto a 40 μm thick, 90% porous ceramic substrate of aluminosilicate fibers and then dried at 200° C. for 5 minutes. Subsequently the coated ceramic substrate was vacuum sintered at 850° C. for 30 minutes and then cooled down to around 20° C. The pressure during sintering was lower than 0.0001 mbar. The resulting porous conductive powder layer is a titanium metal porous film. Subsequently further DSC components were printed onto the porous conductive powder layer and ceramic substrate. The thickness of the porous conductive powder layer was 16 micro-meter and the porosity 44%. The sheet resistance measured was lower than 0.5 Ohm/sq.

A variation of example 2 is that the ceramic substrate is first printed with a porous layer of $TiO_2$ to make the substrate surface smoother and more planar before printing the $TiH_2$ ink. We have found that the smoother the substrate surface before printing the $TiH_2$ ink the lower the porous conductive powder layer sheet resistance for a given porous conductive powder layer thickness.

Example 3

Second Porous Conductive Powder Layer with Platinum Deposited on Ceramic Substrate An ink is prepared by mixing $TiH_2$ with terpineol. The ink is bead milled for 25 minutes at 5000 RPM using 0.3 mm zirconia beads. The zirconia beads are separated from the ink by filtration. The filtered ink is mixed with hexachloroplatinic acid and printed onto a 33 μm thick, porous ceramic substrate of aluminosilicate and then dried at 200° C. for 5 minutes. Subsequently the printed ceramic substrate is vacuum sintered at 585° C. and then cooled down to room temperature. The pressure during sintering was lower than 0.0001 mbar. The resulting second porous conductive powder layer comprises a titanium metal porous film with catalytic amounts of platinum.

A variation of example 3 is that the filtered ink is not mixed with hexachloroplatinic acid but that a solution of hexachloroplatinic acid is printed onto the vacuum sintered porous conductive powder layer which is then dried and then heated to decompose the deposited hexachloroplatinic acid in order to deposit platinum on the surface thus forming a second porous conductive powder layer.

Another variation of example 3 is that the filtered ink is not mixed with hexachloroplatinic acid but that the filtered ink is mixed with platinized conducting particles instead.

A variation of example 3 is that the substrate is based on glass microfiber instead of aluminosilicate fibres.

Another variation of example 3 is that the substrate is based on aluminosilicate fibre and glass microfiber.

The substrate may prior to printing be passed through heated rubber coated rollers causing a smoothening of the surface of the substrate.

Example 4

Second Porous Conductive Powder Layer with Platinum Deposited on Ceramic Substrate An ink is prepared by mixing $TiH_2$ with terpineol. The ink is then bead milled for 25 minutes at 6000 RPM using 0.6 mm zirconia beads. The zirconia beads are separated from the ink by filtration. The filtered ink is mixed with hexachloroplatinic acid and printed onto a 32 μm thick, 90% porous ceramic substrate of aluminosilicate and then dried at 200° C. for 5 minutes. Subsequently the printed substrate was heat treated in vacuum and sintered at 850° C. for 30 minutes and then first cooled down to around 100° C. The pressure during sintering was lower than 0.0001 mbar. The resulting second porous conductive powder layer comprises a titanium metal porous film with catalytic amounts of platinum. The thickness of the second porous conductive powder layer was 20 micrometer and the porosity 50%. The sheet resistance was lower than 0.6 Ohm/sq.

In a variation of example 4 the filtered ink is not mixed with hexachloroplatinic acid and instead a solution of hexachloroplatinic acid is printed onto the vacuum sintered porous conductive powder layer and then dried and heated to decompose the deposited hexachloroplatinic acid in order to deposit platinum on the surface of the second porous conductive powder layer.

The ceramic substrate may first be printed with a porous layer of aluminosilicate to make the substrate surface smoother and more planar before printing the $TiH_2$ ink.

Example 5

Porous Conductive Powder Layer onto Double Side Printed Ceramic Substrate

An ink is prepared by mixing $TiH_2$ with terpineol. The ink is then bead milled for 25 minutes at 5000 RPM using 0.3 mm zirconia beads. The zirconia beads are separated from the ink by filtration. The filtered ink is mixed with platinized conducting particles and printed onto a 33 μm thick, porous glass microfiber based substrate and then dried at 200° C. for 5 minutes.

Another ink prepared by mixing $TiH_2$ with terpineol and bead milled and filtered is then printed onto the opposite side of the glass microfiber substrate so that the first printed layer and the second printed layer are separated by the glass microfiber substrate. The double side printed substrate was then dried at 200° C. for 5 minutes.

Subsequently the double side coated ceramic substrate was vacuum sintered at 585° C. and then allowed to cool down to room temperature. The pressure during sintering was lower than 0.0001 mbar. The resulting double sided printed substrate have a porous conductive powder layer of titanium metal on one side and a second porous conductive powder layer comprising a titanium metal with catalytic amounts of platinum on the other side.

A variation of example 5 is that a porous ceramic coating is deposited on the opposite side of the ceramic substrate prior to printing of the second porous conductive powder layer. Such a ceramic print could be useful in order to prevent electrical contact between the first and second porous conductive powder layers.

Another variation of example 5 is that the $TiH_2$ powder is surface treated with platinum, e.g., by thermal decomposition of a platinum salt deposited on the $TiH_2$ powder, before making an ink.

Another variation of example 5 is that the filtered ink is mixed with hexachloroplatinic acid instead of mixing in platinized conducting particles.

Example 6

Porous Conductive Powder Layer onto Double Side Printed Ceramic Substrate

An ink is prepared by mixing $TiH_2$ with terpineol. The ink is bead milled for 40 minutes at 5000 RPM using 0.3 mm zirconia beads. The zirconia beads are separated from the ink by filtration. The filtered ink is mixed with hexachloroplatinic acid and printed onto a 20 μm thick, 60% porous ceramic substrate of aluminosilicate and then dried at 200° C. for 5 minutes. Another ink comprising $TiH_2$ is then printed onto the other side of the ceramic substrate and then dried at 200° C. for 5 minutes.

Subsequently the double side printed ceramic substrate was vacuum sintered at 850° C. for 30 minutes and then allowed to cool down. The pressure during sintering was lower than 0.001 mbar. The resulting double sided printed substrate have a first porous conductive powder layer comprising a titanium metal porous film one side and a second porous conductive powder layer comprising a titanium metal with catalytic amounts of platinum on porous on the other side. Sheet resistance of each porous conductive powder layer was lower than 0.3 Ohm/sq. Thickness of each layer was around 10 micrometer. Porosity of each layer was higher than 45%.

A variation of example 6 is that a porous ceramic print is printed on the opposite side of the ceramic substrate prior to the printing of the second porous conductive powder layer. Such a ceramic print could be useful in order to prevent electrical contact between the first and second porous conductive powder layer and the ceramic print could therefore be useful to prevent electrical short circuit between the first and second porous conductive powder layer.

Another variation of example 6 is that the ceramic substrate is printed with a porous ceramic on both sides before printing the $TiH_2$ inks.

Another variation of example 6 is that $TiH_2$ particles are surface treated with platinum, e.g., by thermal decomposition of a platinum salt deposited on the $TiH_2$ particles, before making an ink.

Example 7

DSC Based on Porous Conductive Powder Layer Double Side Printed onto Ceramic Substrate A 20 µm thick layer of $TiO_2$ ink containing 20 nm particles was screen printed onto the platinum free first porous conductive powder layer side of a double side printed glass microfiber substrate produced according to example 5 or 6. The thickness of the dried $TiO_2$ ink layer was 1-2 µm. A second 60 µm thick layer of $TiO_2$ ink was printed on top of the first layer of $TiO_2$ and dried. A third $TiO_2$ layer was printed on top of the second $TiO_2$ layer and dried. Subsequently the $TiO_2$ deposited structure was subjected to heat treatment in air at 500° C. for 20 minutes. After cooling down to around 70° C., the $TiO_2$ deposited structure was immersed in a solution of 20 mM Z907 dye in methoxy propanol and heat treated at 70° C. for 30 minutes and subsequently rinsed in methoxy propanol. Thereafter electrolyte was added to the porous conductive powder layer double side printed ceramic substrate and the structure was sealed.

Example 8

Porous Conductive Powder Layer Deposited onto $TiO_2$ Working Electrode

A layer of $TiO_2$ ink is printed on top of a borosilicate glass substrate and then dried at 120° C. for 15 minutes. The thickness of the dried $TiO_2$ ink layer was around 6 µm. A second layer of $TiO_2$ ink was printed on top of the first layer of $TiO_2$ and dried. The thickness of the second dried $TiO_2$ ink layer was around 6 µm. Subsequently the $TiO_2$ deposited glass was subjected to heat treatment in air at 500° C. for 15 minutes.

An ink prepared by mixing $TiH_2$ with terpineol and bead milled and filtered was printed onto the deposited $TiO_2$ layer and then dried at 200° C. for 5 minutes. Subsequently the $TiH_2$ coated $TiO_2$ glass substrate was vacuum heated at 500° C. for 10 minutes. Subsequently the substrate was vacuum sintered at 1000° C. for 30 seconds and then allowed to cool down to around 20° C. The pr$_2$essure during sintering was lower than 0.001 mbar. Subsequently the structure comprising the porous conductive powder layer deposited on $TiO_2$ coated glass is ready to be further produced to a DSC.

Example 9

Free Standing Porous Conductive Powder Layer

An ink is prepared by mixing 8 parts by weight $TiH_2$ (particle size 9 micrometer) and 2 parts by weight titanium particles (particle size: 1 micrometer) with terpineol. The ink is then bead milled for 15 minutes at 6000 RPM and further bead milled for 5 minutes at 7000 RPM using 0.3 mm zirconia beads, thus mixing titanium particles with $TiH_2$ and forming $TiH_2$ particles of suitable size. The zirconia beads were then separated from the ink by filtration. The filtered ink is printed onto a ceramic substrate of zirconia and then dried at 200° C. for 5 minutes. Thereafter the printed zirconia substrate with the dry layer of $TiH_2$ and titanium is vacuum sintered at 850° C. for 30 minutes and then cooled down to around 20° C. The pressure during sintering was lower than 0.0001 mbar. The resulting porous conductive powder layer comprises a titanium metal porous film. The sintered porous conductive powder layer is removed from the zirconia substrate and is ready to be integrated in a DSC. The sheet resistance is lower than 0.9 Ohm/sq and the thickness 24 micrometer and porosity 51%.

Example 10

Free Standing Porous Conductive Powder Layer

An ink is prepared by mixing nickel alloy hydride particles (particle size 15 µm) with terpineol and bead milling the ink for 10 minutes at 6000 RPM using 0.3 mm zirconia beads. The zirconia beads are separated from the ink by filtration. The filtered ink is printed onto a ceramic substrate of zirconia and then dried at 200° C. for 5 minutes. Thereafter the printed zirconia substrate with the dry layer of nickel hydride particles is vacuum sintered at 750° C. for 30 minutes and then cooled down to around 20° C. The pressure during sintering was lower than 0.0001 mbar. The resulting porous conductive powder layer comprises a nickel alloy porous film. The sintered layer is removed from the zirconia substrate and is ready to be integrated in a DSC. The sheet resistance was lower than 1 Ohm/sq and the thickness 19 micrometer and porosity 58%.

Example 11

Free Standing Porous Conductive Powder Layer with Platinum

An ink is prepared by mixing $TiH_2$ (particle size 8 µm) with terpineol. The ink is bead milled for 25 minutes at 5000 RPM using 0.3 mm zirconia beads. The zirconia beads are separated from the ink by filtration. The filtered ink is mixed with platinized conducting particles and printed onto a ceramic substrate of zirconia and then dried at 200° C. for 5 minutes. Subsequently the printed zirconia substrate is vacuum sintered at 850° C. for 30 minutes and then cooled down to around 25° C. The pressure during sintering was lower than 0.0001 mbar. The resulting second porous conductive powder layer comprises a titanium metal porous film with catalytic amounts of platinum. The sintered layer is removed from the zirconia substrate and is ready to be integrated as a counter electrode in a DSC.

Example 12

Free Standing Porous Conductive Powder Layer

An ink is prepared by mixing $TiH_2$ (particle size 8 µm) with terpineol. The ink is bead milled for 15 minutes at 6000 RPM and then bead milled for 5 minutes at 7000 RPM using 0.3 mm zirconia beads, thus forming $TiH_2$ particles of suitable size. The zirconia beads are separated from the ink by filtration. The filtered ink is printed onto a ceramic substrate of zirconia and then dried at 200° C. for 5 minutes. Thereafter the printed zirconia substrate with the dry $TiH_2$ layer is vacuum sintered at 600° C. and then cooled down to around 20° C. The pressure during sintering was lower than 0.0001 mbar. The resulting layer is porous conductive powder layer of titanium. The sintered layer is removed from the zirconia substrate and is ready to be integrated in a DSC. The sheet resistance of the layer was measured lower than 0.2 Ohm/sq. The thickness of the porous conductive powder layer is 12 micrometer and the porosity 45%. A variation of example 12 can be that the zirconia substrate is exchanged with a metal foil substrate such as, e.g., molybdenum foil which is pre-deposited with a thin layer of a non-sticking material such as, e.g., boron nitride or zirconia or yttrium oxide.

Example 13

Free Standing Porous Conductive Powder Layer with Platinum

An ink is prepared by mixing $TiH_2$ (particle size 8 µm) with terpineol. The ink is bead milled for 15 minutes at 6000 RPM using 0.6 mm zirconia beads. The zirconia beads are then separated from the ink by filtration. The filtered ink is mixed with hexachloroplatinic acid and printed onto a ceramic substrate of zirconia and then dried at 200° C. for 5 minutes. Subsequently the printed zirconia substrate is vacuum sintered at 900° C. for 25 minutes and then cooled down to around 20° C. The pressure during sintering was lower than 0.0001 mbar. The resulting layer is a porous conductive powder layer of titanium with catalytic amounts of platinum. The sintered layer is removed from the zirconia substrate and is ready to be integrated as a counter electrode in a DSC. The sheet resistance of the layer was lower than 0.3 Ohm/sq. The thickness of the layer was 10 micrometer and the porosity 48%.

A variation of example 13 is that the filtered ink is not mixed with hexachloroplatinic acid but that a solution of hexachloroplatinic acid is printed onto the vacuum sintered porous conductive powder layer instead and then dried and heated to decompose the deposited hexachloroplatinic acid in order to deposit platinum on the surface of the vacuum sintered porous conductive powder layer.

Example 14

DSC Based on Free Standing Porous Conductive Powder Layer

A porous conductive powder layer produced according to example 12 was immersed into a 0.02 M $TiCl_4$ solution in water and heat treated at 70° for 30 minutes. The layer was removed from the $TiCl_4$ solution and rinsed in first water and then ethanol. Subsequently a layer of $TiO_2$ based ink was printed on one side of the PCPL and then dried. The thickness of the dried $TiO_2$ ink layer was 1-2 µm. A second 60 µm thick layer of $TiO_2$ ink was printed on top of the first layer of $TiO_2$ and dried. A third $TiO_2$ layer was printed on top of the second $TiO_2$ layer and dried. Subsequently the structure was subjected to a heat treatment in air at 500° C. for 30 minutes. After allowing the structure to cool down; the structure was immersed in 0.02 M TiCl4 in water and heat treated at 70° C. for 30 minutes. After rinsing the $TiO_2$ deposited PCPL in water and ethanol it was heat treated at 500° C. in air for 5 minutes. Subsequently the $TiO_2$ deposited porous conductive powder layer structure was immersed in a solution of 20 mM Z907 dye in methoxy-propanol and heat treated at 70° C. for 30 minutes and then rinsed in methoxy propanol. A free standing second porous conductive powder layer comprising platinum or a PCPL with platinum deposited on ceramic substrate in accordance with example 11 or 13, is positioned at a 25 µm distance from the down side of the porous conductive powder layer opposite to the dyed $TiO_2$ working electrode layer. Thereafter electrolyte was added and the cell sealed. The efficiency of the cell was measured at simulated AM 1.5 light. The efficiency of the cell was 8.2%.

A variation of example 14 is that one or both of the $TiCl_4$ treatments are omitted.

Another variation of example 14 is that the free standing second porous conductive powder layer is exchanged with a platinized titanium foil.

Another variation of example 14 is that, instead of using a free standing second porous conductive powder layer with platinum, a second porous conductive powder layer with platinum deposited on ceramic substrate according to example 3 or 4 is used as counter electrode. To avoid short circuit, the surface of the ceramic substrate opposite to the second porous conductive powder layer is brought into contact with the down side of the porous conductive powder layer opposite to the dyed $TiO_2$ layer.

Example 15

Porous Conductive Powder Layer on Ceramic Substrate Using Dry Powder Deposition $TiH_2$ powder of a particle size <2 µm is deposited onto a zirconia ceramic substrate using dry powder deposition technique by sieving the $TiH_2$ powder onto the ceramic substrate. Subsequently the deposited ceramic substrate was vacuum sintered at 850° C. for 30 minutes and then allowed to cool down to around 20° C. The pressure during sintering was lower than 0.0001 mbar. Thereafter the vacuum sintered porous conductive powder layer was removed from the zirconia substrate and ready to be integrated into a DSC. The sheet resistance of the layer was lower than 0.7 Ohm/sq. The thickness of the layer was 32 micrometer and the porosity 56%.

Example 16

Porous Conductive Powder Layer onto Double Side Printed Ceramic Substrate where Second Porous Conductive Powder Layer has a Separate Catalytic Layer An ink is prepared by mixing $TiH_2$ with terpineol. The ink is then bead milled for 25 minutes at 5000 RPM using 0.3 mm zirconia beads. The zirconia beads are separated from the ink by filtration. The filtered ink is mixed with platinized conducting particles and printed onto a 33 µm thick, porous glass microfiber based substrate and then dried at 200° C. for 5 minutes. Another ink is prepared by mixing $TiH_2$ with terpineol. The ink is then bead milled and filtered and a second platinum free layer is then printed onto the first printed layer containing platinized conducting particles. The printed substrate was then dried at 200° C. for 5 minutes. An ink is prepared by mixing $TiH_2$ with terpineol. The ink is then bead milled and filtered and a third layer is then printed onto the opposite side of the glass microfiber substrate so that the first printed layer is separated from the second printed layer and the third printed layer by the glass microfiber substrate. The double side printed substrate was then dried at 200° C. for 5 minutes.

Subsequently the double side printed ceramic substrate was vacuum sintered at 585° C. and then allowed to cool down to room temperature. The pressure during sintering was lower than 0.0001 mbar. The resulting double sided printed substrate have a porous conductive powder layer of titanium metal on one side of the glass microfiber substrate and on the other side of the glass microfiber substrate there is a second porous conductive powder layer comprising titanium metal and platinum and a third porous conductive powder layer comprising titanium metal.

In the examples the ink can be made with water as a solvent or organic solvents, such as terpenes, alcohols, glycolethers, glycol ether acetates, ketones, hydrocarbons, and aromatic solvents, may be used as well.

Binders, or other such substances, can be used to enhance the mechanical strength of the deposited particle layer before the heat treatment of the layer.

To achieve a catalytic effect in the counter electrode, it is possible to mix in platinized particles of conductive metal oxides with the metal hydride particles, such as platinized ITO, ATO, PTO, and FTO. Platinized particles of conductive metal carbides and metal nitrides can also be mixed with the metal hydride particles. Also particles of platinized carbon black or graphite can be mixed with the metal hydride particles. Platinization can be accomplished by mixing, e.g., a dissolved platinum salt like, e.g., hexachloroplatinate or platinum tetrachloride with a conducting particles and removing the solvent by evaporation and heating the mixture to a temperature high enough to decompose the platinum salt and deposit metallic platinum onto the surface of the conducting particles.

There are a number of variations possible for manufacturing the porous conductive powder layers and the DSC comprising a porous conductive powder layer in accordance with the invention and the examples represent only a part of the variations possible.

The invention claimed is:

1. A method for manufacturing a porous conductive powder stack for a dye-sensitized solar cell, comprising:
    providing an electrically insulating flexible porous substrate, the electrically insulating flexible porous substrate having a first surface and a second surface respectively at opposite sides of the electrically insulating flexible porous substrate relative to a direction that traverses the porous conductive powder stack;
    printing a first powder deposit comprising titanium hydride particles onto the first surface of the electrically insulating flexible porous substrate to form a porous conductive powder layer back contact;
    printing a second powder deposit comprising titanium hydride particles onto the second surface of the electrically insulating flexible porous substrate to form a porous conductive powder layer counter electrode;
    heating the first powder deposit and the second powder deposit comprising titanium hydride particles in one or more heat treatment steps to decompose the titanium hydride particles in both the first powder deposit and the second powder deposit comprising titanium hydride particles to titanium particles; and
    sintering the titanium particles to form the porous conductive powder stack.

2. The method according to claim 1, wherein the one or more heat treatment steps comprise a heating step performed at a temperature above the hydride decomposition temperature and below the sintering temperature of the titanium particles, said temperature being in the range of between 350-500° C., and a subsequent heating step performed at a temperature where the titanium particles sinter.

3. The method according to claim 1, wherein the heating to decompose the titanium hydride particles and the sintering of the titanium particles is performed in one heat treatment step at a temperature where the titanium particles sinter.

4. The method according to claim 1, wherein the titanium particle sintering temperature is between 550-1250° C.

5. The method according to claim 1, wherein the sintering of the titanium particles takes place in vacuum or inert gas.

6. The method according to claim 1, wherein the porous conductive powder stack comprises sintered metal particles having non-spherical, irregular form.

7. The method according to claim 1, wherein the electrically insulating flexible porous substrate is a porous ceramic substrate.

8. The method according to claim 7, wherein a surface of the porous ceramic substrate is smoothened before printing at least one of the first powder deposit or the second powder deposit comprising titanium hydride particles.

9. The method according to claim 1, wherein the porous conductive powder stack has a sheet resistance <1 ohm/sq.

10. The method according to claim 1, wherein printing of at least one of the first powder deposit or the second powder deposit comprising titanium hydride particles comprises screen printing.

11. The method according to claim 1, wherein the second powder deposit comprising titanium hydride particles comprises a catalyst for forming the porous conductive powder layer counter electrode.

12. The method of claim 1, wherein the electrically insulating flexible porous substrate is a ceramic.

* * * * *